Jan. 25, 1938.  H. A. SMITH  2,106,307
AUTOMATIC TRANSMISSION CONTROL
Filed April 8, 1936  3 Sheets-Sheet 1
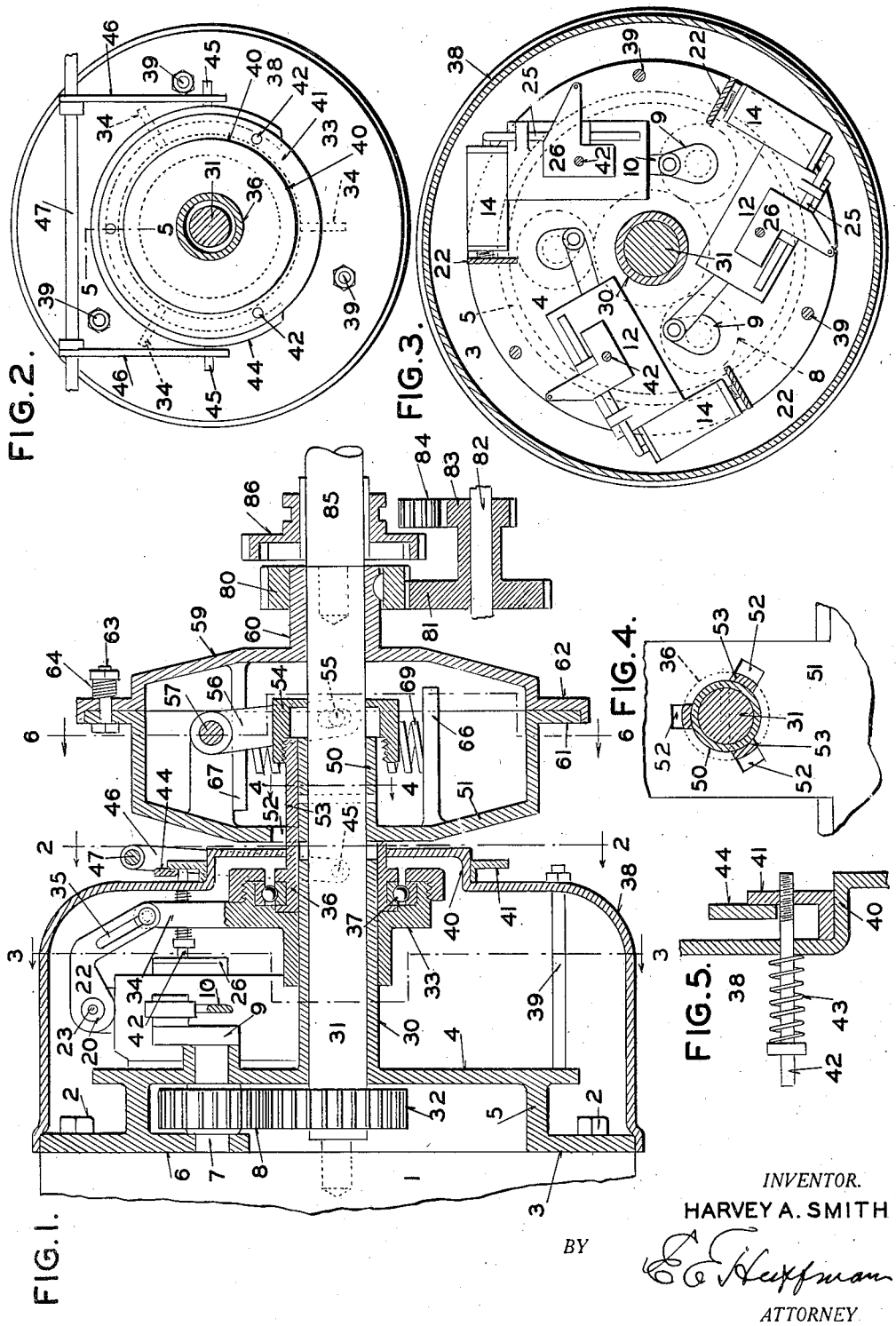
INVENTOR.
HARVEY A. SMITH
BY
ATTORNEY

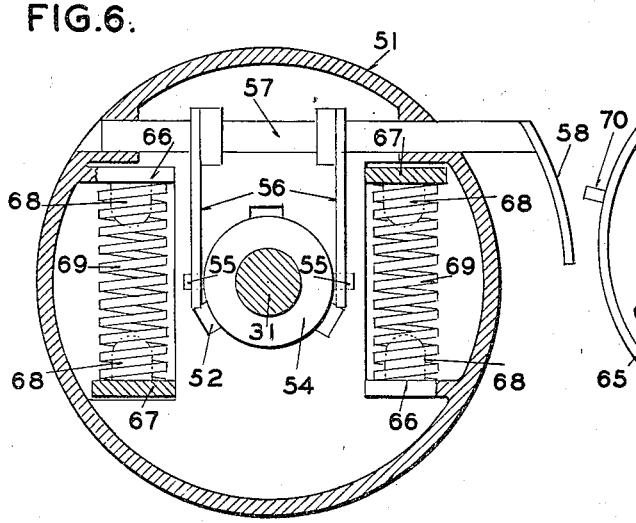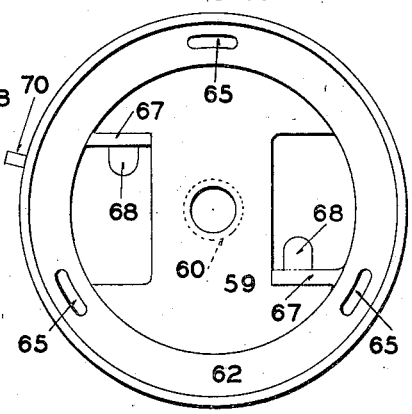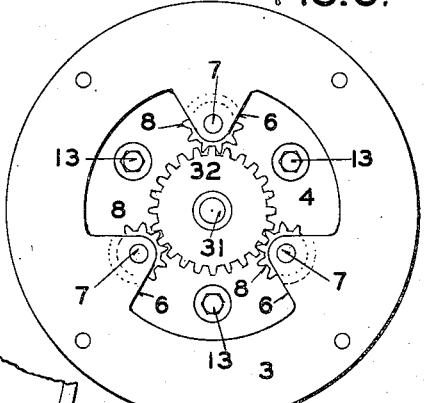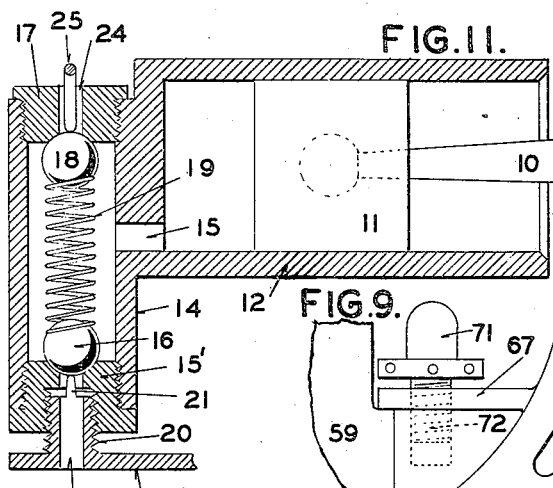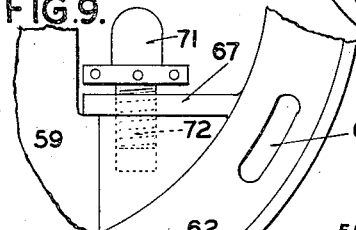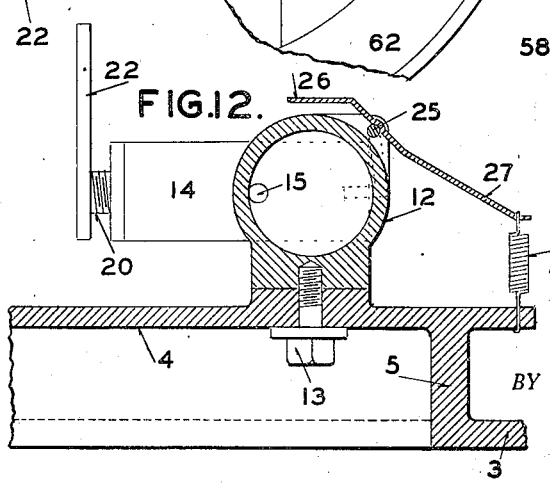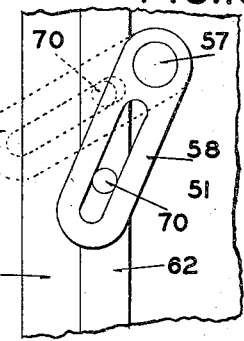

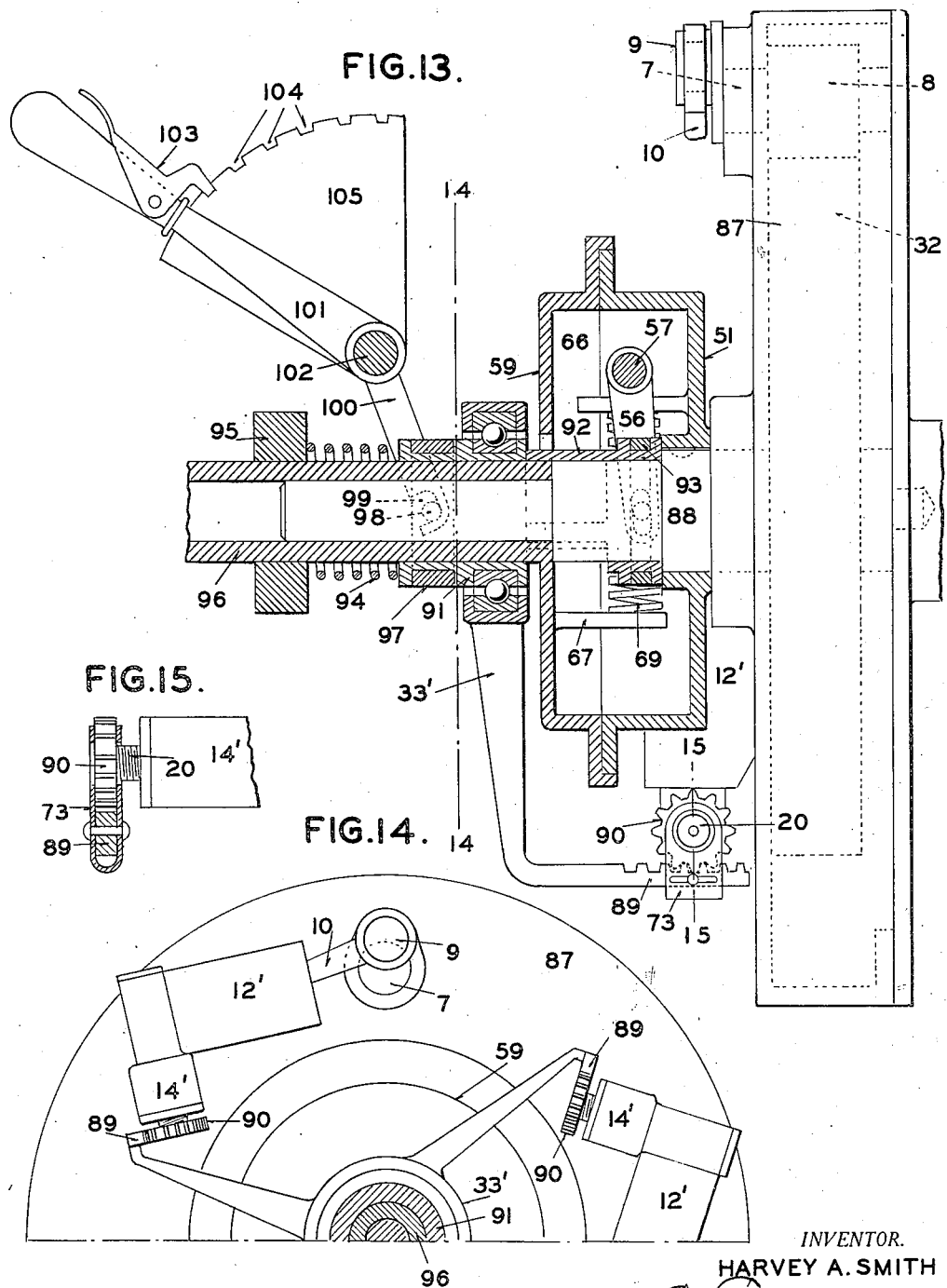

Patented Jan. 25, 1938

2,106,307

UNITED STATES PATENT OFFICE 2,106,307

AUTOMATIC TRANSMISSION CONTROL

Harvey A. Smith, Webster Groves, Mo.

Application April 8, 1936, Serial No. 73,200

5 Claims. (Cl. 74—294)

My invention relates to the automatic control of power transmission from a driving to a driven member and particularly to that type of transmission in which the relative speed of rotation between the driving and driven members is determined by fluid pressure means. While my invention is primarily adapted to the transmission of power from the motor to the wheels of a motor vehicle, it may be adapted to various other types of power transmission.

One object of my invention is to provide means for controlling the admission and discharge of fluid to and from the fluid pressure means by a torque-actuated device so that the speed ratio is automatically regulated in a selective and flexible manner to adapt it to the load to be driven.

Another object of my invention is to provide manually-operated means independent of the torque-actuated device for controlling flow of fluid to and from the fluid pressure means.

A further object of my invention is to provide manually-operated means cooperating with the torque-actuated means for controlling the action of the fluid pressure means.

In the accompanying drawings, which illustrate two forms of transmission mechanism made in accordance with my invention, Figure 1 is a vertical longitudinal section of one form of my invention adapted for use as an automobile transmission; Figure 2 is a section taken on the line 2—2 of Figure 1; Figure 3 is a section taken on the line 3—3 of Figure 1; Figure 4 is a section taken on the line 4—4 of Figure 1; Figure 5 is an enlarged section taken on the line 5—5 of Figure 2; Figure 6 is a section taken on the line 6—6 of Figure 1; Figure 7 is a detail view of one of the torque discs; Figure 8 is a rear view of the driving spider; Figure 9 is an enlarged view showing a modification of the torque disc; Figure 10 is an enlarged side view of a portion of the torque discs; Figure 11 is an enlarged longitudinal section of one of the retarding cylinders; Figure 12 is an enlarged cross section through the cylinder; Figure 13 is a side view, partly in section and partly in elevation, showing a modification; Figure 14 is a semi-section taken on the line 14—14 of Figure 13; and Figure 15 is a section taken on the line 15—15 of Figure 13.

Referring first to Figures 1 to 12, inclusive, showing a form of my device particularly adapted for use as an automobile transmission, the numeral 1 indicates the fly-wheel of the motor to which is secured by bolts 2, a spider forming the driving member and comprising an annular part 3 and a disc-shaped plate 4 connected by a web 5.

Projecting inwardly from the part 3 are three lugs 6 (Figures 1 and 8). In these lugs and the plate 4 are journaled short shafts 7 each carrying a planet gear 8. On the inner end of each shaft is a crank-arm 9 connected by a pitman 10 to piston 11 of one of three cylinders 12 secured to the face of the plate 4 by any suitable means, such as bolts 13.

Each cylinder is provided with a valve casing 14 communicating with the cylinder through a port 15 (Figures 11 and 12). One end of the casing is closed by a plug 15' provided with a seat for a main valve 16 and the other by a plug 17 having a seat for an auxiliary valve 18. These valves are preferably of the ball type and are held against their seats by a coil spring 19 positioned between them. Threaded in the plug 15' is a smaller plug 20 having one or more prongs 21 engaging the valve 16 to move it off its seat to a greater or less extent as required. The threads of the plug 20 are of relatively large pitch so that the necessary movement of the valve may be secured by a partial rotation of the plug. Each of the plugs 20 is provided with an arm 22 by means of which it may be operated by a torque-actuated device, hereinafter described, to regulate the flow of oil or other fluid through a port 23 in the plug. The plug 17 is provided with a central port 24 through which projects the L-shaped end of a rock-shaft 25 journaled in lugs on the cylinder. Brazed or otherwise secured to each rock-shaft is a plate 26 having a tail piece 27 connected by a tension spring 28 with the plate 4, which spring holds the L-shaped end of the rock-shaft against the valve 18 to unseat it and permit free passage of fluid through port 24. When, however, plate 26 is moved toward the cylinder the L-shaped end is retracted, permitting the seating of the valve under tension of spring 19.

Centrally carried on plate 4 is a sleeve 30 in which freely rotates a shaft 31 constituting one part of the driven element of the device. On the end of the shaft 31 is a sun gear 32 meshing with the planet gears 8. Mounted on the sleeve 30 is a spider 33 having three arms 34 each connected to a slot 35 in one of the arms 22 on the valve controlling plugs 20 so that when the spider is moved longitudinally of the sleeve, the position of the ball valves 16 will be controlled. Longitudinal movement is imparted to the spider by a sleeve 36 connected thereto by a bearing 37, preferably of anti-friction type, so that these parts move together longitudinally but are free to rotate independently. The driving member, together with its cylinders and the spider, are enclosed in a reservoir casing 38 held in position by bolts 39. This casing contains oil, not only to supply the cylinders but to lubricate the running parts contained therein. Surrounding an offset part 40 of the reservoir casing is an annular member 41 carrying three rods 42 normally held in contact with plates 26 by springs 43 (Figure 5) to retract the L-shaped ends of rock-shafts 25 and allow the secondary valves 18 to seat. To withdraw rods 42 and thus open valves 18, a yoke 44 engages the member 41. This yoke is provided with trunnions 45 engaged by arms 46 on a rock-shaft 47 which is operated by any suitable connections (not shown) from the clutch pedal of the machine.

Rigidly secured to the shaft 31 adjacent the reservoir casing is a collar 50 of a casting 51 forming one member of a torque-actuated device. Formed in this member adjacent the collar 50 are openings 52 through which project arms 53 formed by slotting the end of sleeve 36. The ends of these arms are threaded to receive a cap 54 having trunnions 55 engaged by arms 56 carried on a rock-shaft 57. This shaft is journaled in the member 51 and has a projecting end on which is carried a slotted arm 58. A second member 59 of the torque-actuated device is mounted on the shaft 31 by means of a collar 60 so as to have rotary movement relative thereto and, consequently, to the first member of the device. The members 51 and 59 are provided with flanges 61 and 62, respectively, which are clamped together by bolts 63 surrounded by springs 64 to provide a friction cushioning effect upon the movement between the parts and this movement is limited by slots 65 in the flange 62, through which slots the bolts pass. Carried by the part 51 are a pair of brackets 66 and on the part 59 a pair of similar brackets 67. Each of the brackets is provided with a boss 68 to engage one end of a helical spring 69, two of which are employed, each being interposed between one of the brackets 66 and one of the brackets 67. The brackets on each part are alternately arranged, as best shown in Figures 6 and 7, so that both springs oppose relative movement of the parts in the same direction. When the springs 69 are compressed by the torque resultant from transmitting power from member 51 to 59, the two parts have relative rotary movement causing a pin 70 on the flange 62 and engaging the slotted arm 58 to move said arm from the position shown in full lines in Figure 10 to that shown in dotted lines. This actuates the rock-shaft 57 to move the sleeve 36 and spider 33 toward the left-hand end of Figure 1 and so open the primary cylinder valves 16.

If it is desired to adjust the tension of the springs 69, one end of each spring, instead of bearing directly on its bracket, engages with an adjustable boss 71 (Figure 9). This boss has a stem 72 threaded into the bracket so that by rotating the boss in one direction or the other, the tension of the spring may be increased or decreased.

Some means for throwing the machine into reverse or neutral positions is necessary. At the right-hand end of Figure 1, I have shown an old and well-known form of such means comprising a gear 80 keyed to the collar 60 and meshing with a gear 81 on a counter-shaft 82. The gear 81 is connected to a gear 83 meshing with a reversing gear 84. A shaft 85, forming a continuation of shaft 31 and extending to the differential of the machine, has splined on it a gear 86 provided with internal and external teeth. When gear 86 is in the position shown, the device is in neutral and the part 31 of the driven member is free to rotate without imparting motion to the part 85. When the gear 86 is moved to the left, its internal teeth engage with the teeth of gear 80, thus effecting direct coupling between shafts 31 and 85. When the gear is moved to the right, its external teeth engage with gear 84, thus reversing the direction of rotation of shaft 85 with respect to shaft 31 so that the car may be backed.

Briefly stated, the operation of my device is as follows: When the machine is started with the engine running, the clutch pedal is depressed to open the secondary valve 18. This permits the pistons to move freely in the cylinders so that part 31 of the driven shaft comes to rest, after which gear 86 is moved into mesh with gear 80 by the clutch lever. The clutch pedal is now released to close valves 18. Upon closure of valves 18, the movement of the pistons in the cylinders is checked so that rotation of planet gears 8 is prevented and the driving member is locked to shaft 31. Movement of shaft 31 is now transmitted to the wheels of the car. As the power is transmitted through the torque-actuated device, the inertia of the car will cause springs 69 of the torque device to be compressed, thus opening the primary valves 16 to such a degree as to lower the speed ratio between the driving and driven members until the resistance of the car to movement is overcome. As this result is being accomplished, the valves 16 will be gradually closed by the return of spring 69 to normal, which occurs under normal running conditions. If at any time the resistance of the car is increased, as for example, by moving up an incline, the springs 69 are again compressed to open the valves 16 to a greater or less degree, as required to secure the necessary reduction of speed ratio between the driving and driven members to compensate for the increased resistance.

In Figures 13 and 14 I have shown a modification of my device to adapt it to applications where it is desirable to regulate the output of a power unit in a manner similar to that accomplished by a steam throttle or by a rheostat in the case of an electric motor. In this construction I supplement the torque-actuated control of the retarding cylinders by a manual control cooperating therewith so that the output is regulated by their combined action. A spider 87, corresponding to the driving member of the first described construction, carries the planet wheels 8 meshing with the sun wheel 32 on the driven shaft 88 to which is directly keyed the member 51 of the torque-actuated device. The planet wheels drive the pistons of cylinders 12', which are like the cylinders 12 except that they are provided only with primary valves, the function of the auxiliary valves being unnecessary in this construction. The primary valves are actuated by racks 89 engaging with gears 90 on the valve plugs. It will be understood that this method of actuating the valves may be substituted for the slotted arms 22 in the form previously described. The racks are carried on a spider 33' similar to the spider 33. This spider is moved longitudinally by the engagement of its hub 91 by the ends of a split sleeve 92 connected to the arms 56 of the rock-shaft 57 by a yoke 93 so as to permit relative rotary movement between the two parts of the torsion device without disturbing the connection.

To prevent disengagement of the racks 88 from the gears 90, the former are provided with U-shaped guards 73 embracing the gears, as best shown in Figure 15. The hub is held against the ends of the arms 92 by a coil spring 94 interposed between the hub and an abutment 95 which preferably provides a bearing for a sleeve 96. This sleeve is formed integral with the part 59 and constitutes the second part of the driven member connected either directly or indirectly to the load. The hub is provided with a yoke 97 having trunnions 98 engaging open-sided slots 99 in an arm 100 carried by a lever 101 mounted on a shaft or stud 102. The lever is provided with a dog 103 engaging with one or the other of a series of notches 104 in arcuate rack 105.

When the parts are in the position shown, with the hub 91 bearing against the ends of arms 92, the opening of the cylinder valves will depend solely upon the compression of the springs of the torque device. If, however, the dog 103 is moved up into engagement with one of the other notches 104, the hub will be moved out of contact with the arms 92 carrying with it the spider 33' and thus opening the cylinder valves to a greater or less degree, as desired. This determines the maximum ratio between the driving and driven members, which ratio cannot be exceeded while the manual control is in this position. Should the torque transmitted exceed that corresponding to this ratio, the arms 92 will contact the hub and move it further to the left, an operation permitted by the open-sided slots 99 out of which the trunnions may be moved. The speed ratio will now be under automatic control of the torque device.

Having fully described my invention, what I claim as new and desire to secure by Letters Patent of the United States is:

1. In a device of the class described, the combination with a driving member, of a driven member, sun and planet gearing connecting said members, a cylinder controlling said gearing and determining the relative speed of rotation of said members, a main valve for said cylinder, an auxiliary valve for said cylinder, torque-actuated means for controlling said main valve, and manually-actuated means for controlling the auxiliary valve.

2. In a device of the class described, the combination with a driving member, of a driven member, a plurality of cylinders carried by one of said members, pistons carried by the other of said members, planet gears also carried by said members and driving said pistons, each of said cylinders being provided with a main valve and an auxiliary valve, a sun gear carried by the other member and engaging said planetary gears, torque-actuated means for controlling the main piston valves, and manually-actuated means for controlling the auxiliary piston valves.

3. In a device of the class described, the combination with a driving member, of a driven member, a plurality of cylinders carried by one of said members, pistons carried by the other of said member, planet gears also carried by one of said members and provided with crank means driving said pistons, each of said cylinders being provided with a valve, torque-actuated means including a pair of torque members having limited relative movement, one of said torque members being rigidly connected to the driven member, spring means interposed between the torque members to oppose their relative movement, connections operated by the relative movement of the torque members, said connections controlling the cylinder valves, auxiliary valves for said cylinders, and manually-operated means for actuating said auxiliary valves.

4. In a device of the class described, the combination with a driving member provided with a sleeve, of a driven shaft extending through said sleeve, planet gears carried by said driving member, a sun gear carried by said shaft and meshing with said planet gears, cylinders mounted on the driving member, pistons in said cylinders, said pistons being crank driven from said planet gears, valves for said cylinders, a reservoir casing carried by the driving member and enclosing the cylinders, a collar on the sleeve projecting through the casing, connections between said collar and the cylinder valves for actuating the latter, a two part torque-actuated device positioned outside of the reservoir casing, one part of said torque device being connected to the driven shaft and the other to the sleeve, and means operative upon the relative movement of the parts of the torque device for shifting the collar to control the cylinder valves.

5. In a device of the class described, the combination with a driving member provided with a sleeve, of a driven shaft extending through said sleeve, planet gears carried by said driving member, a sun gear carried by said shaft and meshing with said planet gears, cylinders mounted on the driving member, pistons in said cylinders, said pistons being crank driven from said planet gears, valves for said cylinders, a reservoir casing carried by the driving member and enclosing the cylinders, a collar on the sleeve projecting through the casing, connections between said collar and the cylinder valves for actuating the latter, a two part torque-actuated device positioned outside of the reservoir casing, one part of said torque device being connected to the driven shaft and the other to the sleeve, means operative upon the relative movement of the parts of the torque device for shifting the collar to control the cylinder valves, auxiliary valves for the cylinders, and manually-operated means for actuating said auxiliary valves.

HARVEY A. SMITH.